F. B. CARLISLE.
APPARATUS FOR MAKING PNEUMATIC TIRE CASINGS.
APPLICATION FILED DEC. 6, 1916. RENEWED DEC. 10, 1919.
1,345,995.
Patented July 6, 1920.
6 SHEETS—SHEET 1.
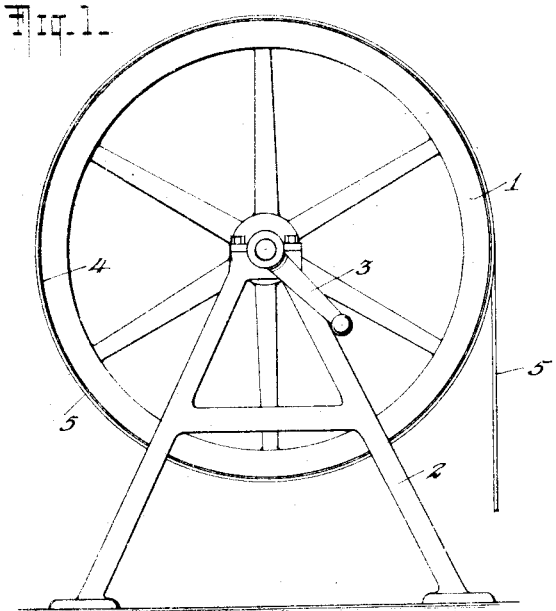
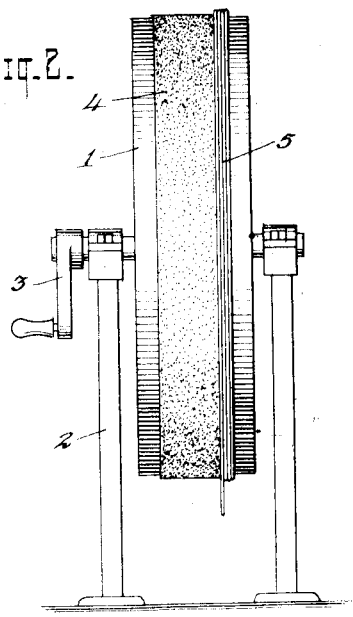
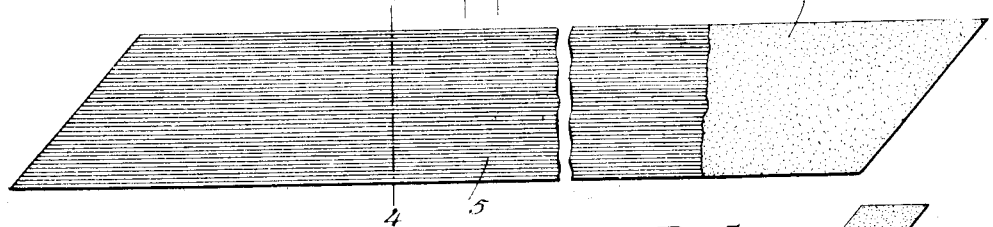
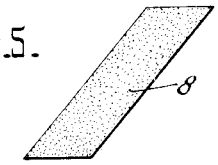
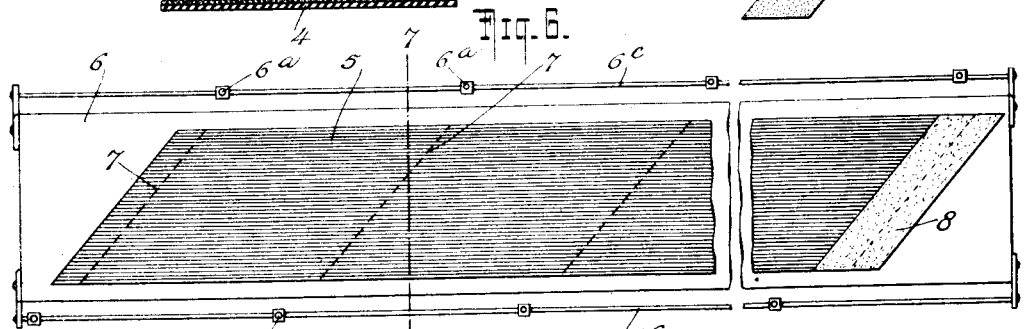
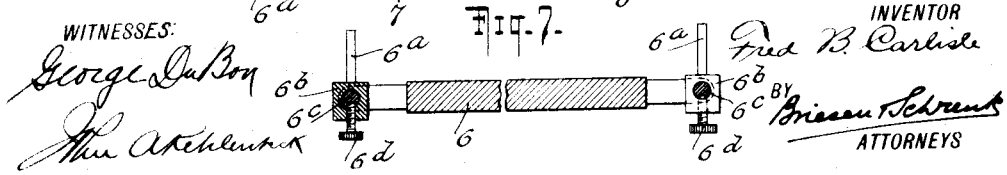
WITNESSES:
George DuBoy
Thru Atchlenink
INVENTOR
Fred B. Carlisle
BY Briesen & Schrenk
ATTORNEYS

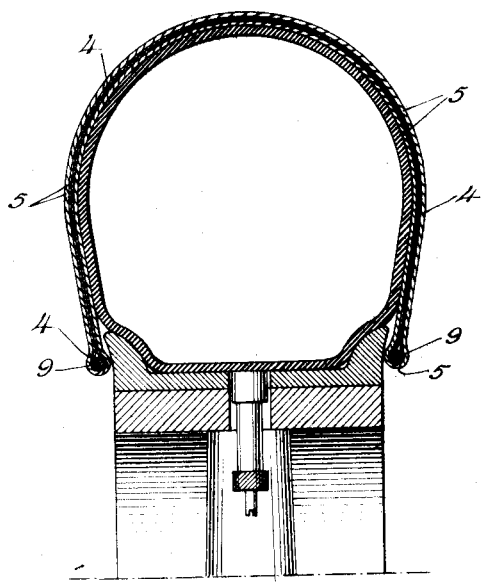
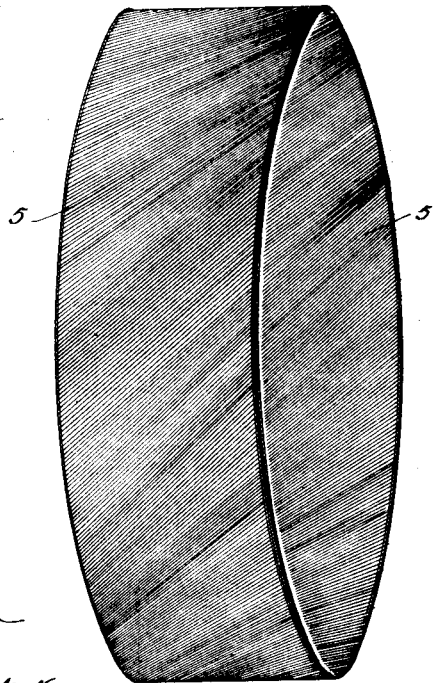

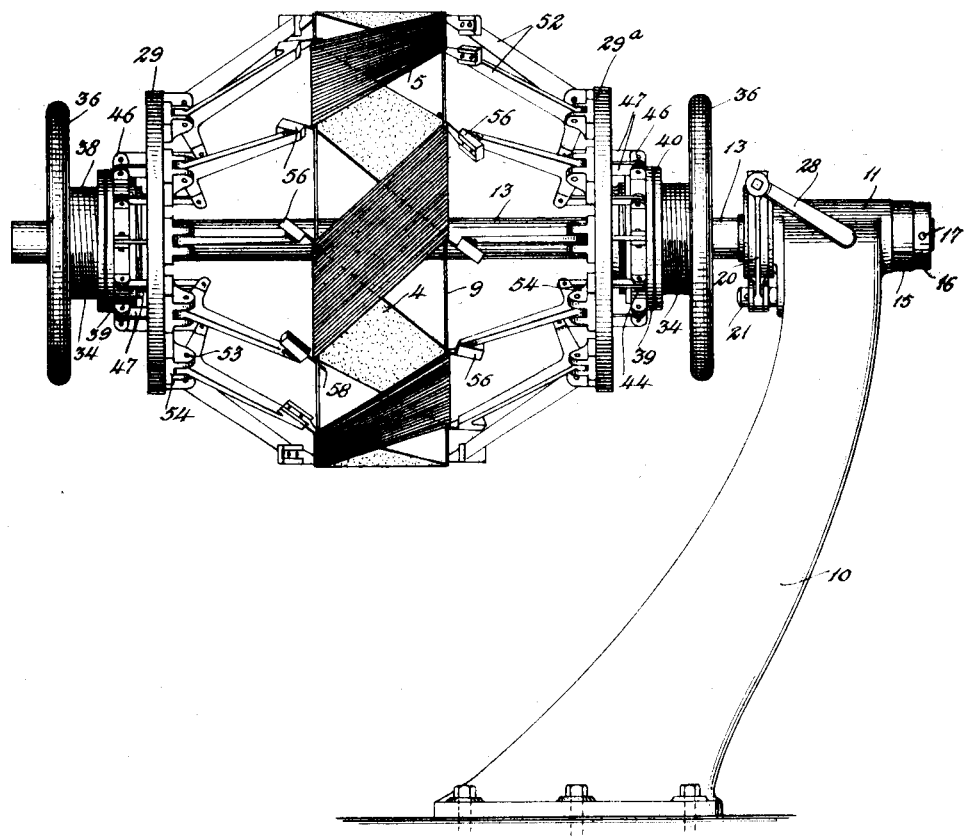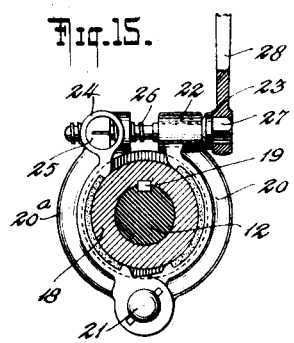

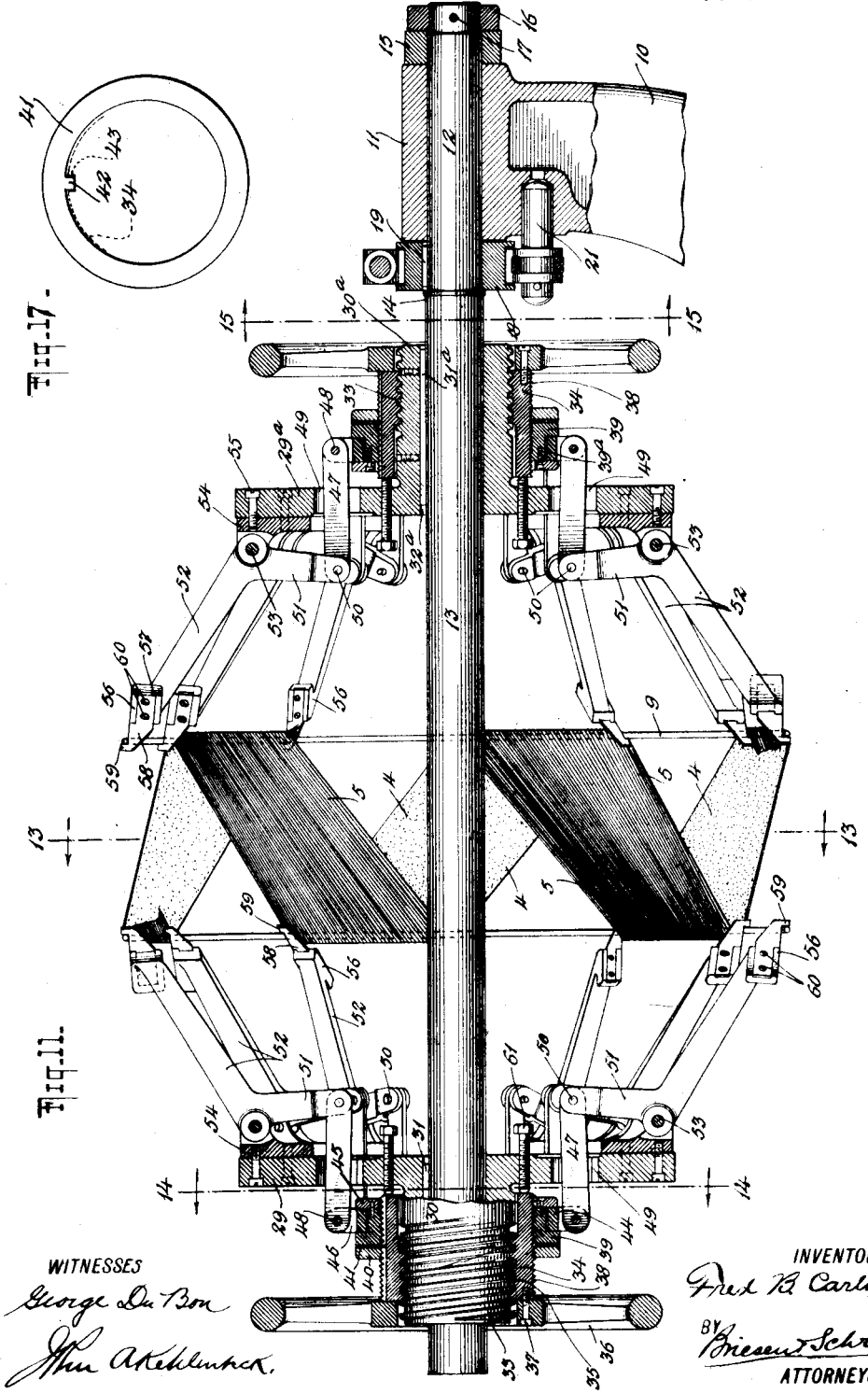

F. B. CARLISLE.
APPARATUS FOR MAKING PNEUMATIC TIRE CASINGS.
APPLICATION FILED DEC. 6, 1916. RENEWED DEC. 10, 1919.
1,345,995.
Patented July 6, 1920.
6 SHEETS—SHEET 5.
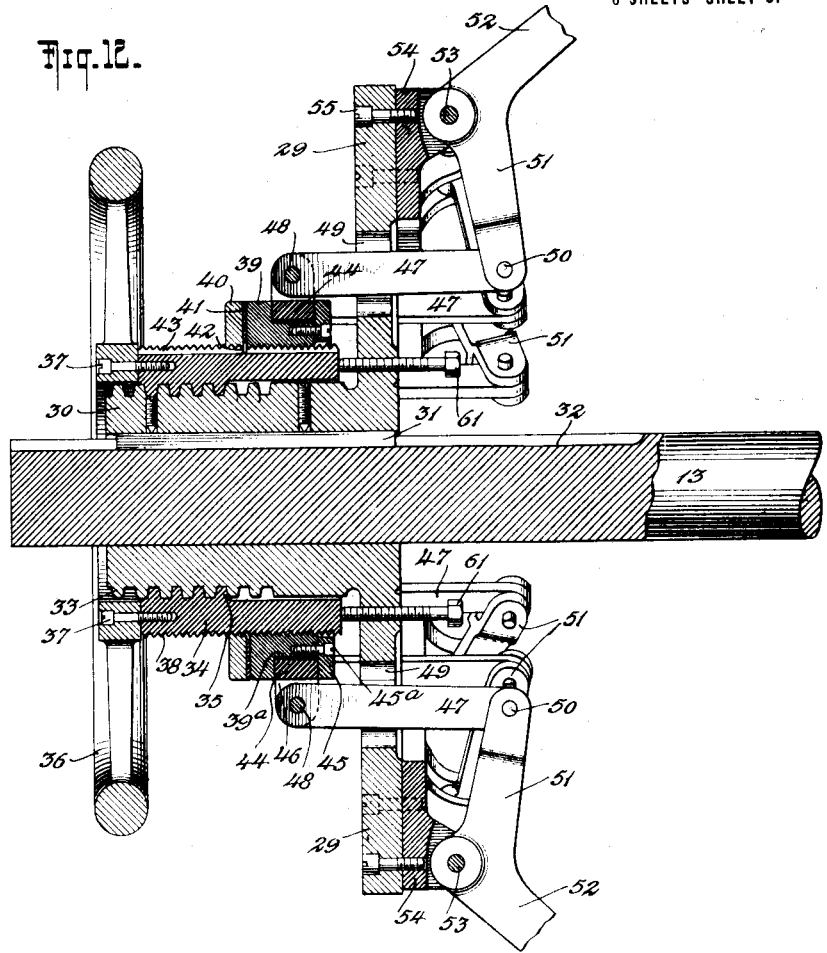
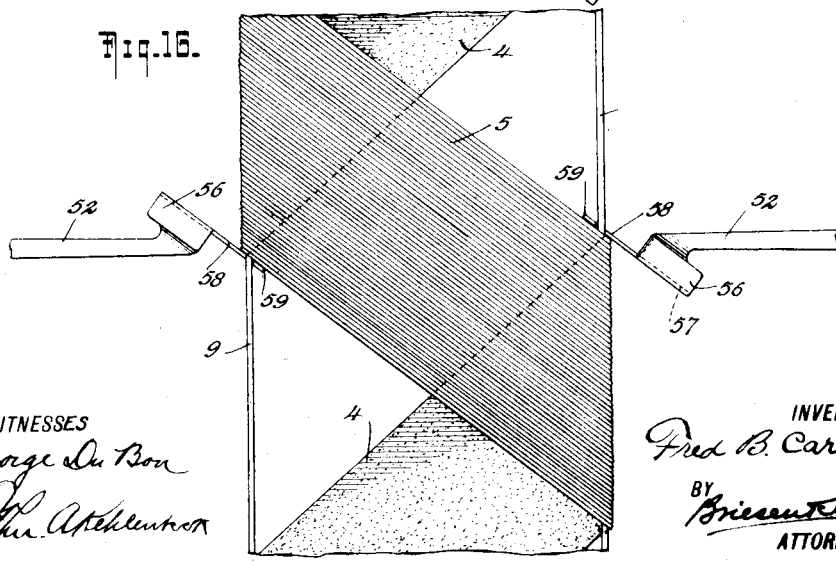
WITNESSES
INVENTOR
Fred B. Carlisle
BY
ATTORNEYS F. B. CARLISLE.
APPARATUS FOR MAKING PNEUMATIC TIRE CASINGS.
APPLICATION FILED DEC. 6, 1916. RENEWED DEC. 10, 1919.
1,345,995.
Patented July 6, 1920.
6 SHEETS—SHEET 6.
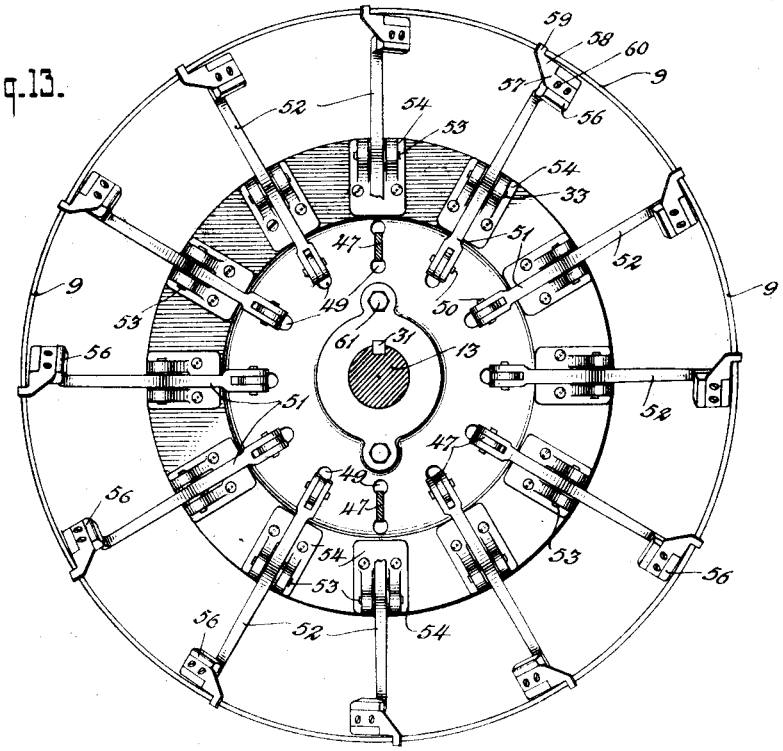
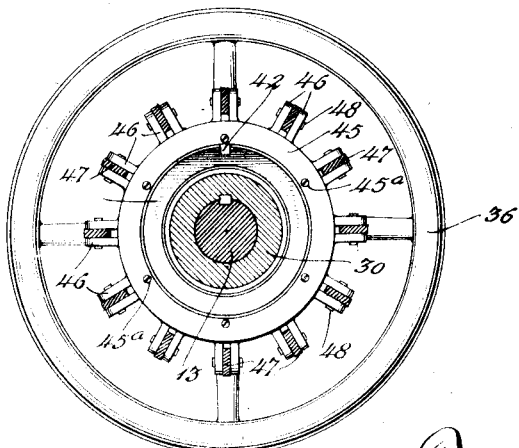

UNITED STATES PATENT OFFICE.

FRED B. CARLISLE, OF ANDOVER, MASSACHUSETTS, ASSIGNOR TO JOSEPH M. GILBERT, OF NEW YORK, N. Y.

APPARATUS FOR MAKING PNEUMATIC-TIRE CASINGS.

1,345,995. Specification of Letters Patent. Patented July 6, 1920.

Application filed December 6, 1916, Serial No. 135,353. Renewed December 10, 1919. Serial No. 343,815.

*To all whom it may concern:*

Be it known that I, FRED B. CARLISLE, a citizen of the United States, and a resident of Andover, county of Essex, State of Massachusetts, have invented certain new and useful Apparatus for Making Pneumatic-Tire Casings, of which the following is a specification.

My invention relates to the apparatus required for making pneumatic tire casings and more particularly to that type of such casings in which layers of cord replace the customary fabric layers. The object of my invention is to provide mechanism for producing a casing of the indicated type having a maximum period of usefulness and in which internal stresses and strains tending to produce friction and to wear out the structure and reduce its life are obviated or reduced to a minimum. A further object of my invention is to provide means which will operate on the lines of a simple process whereby my improved casing may be produced at a minimum cost and with a maximum of speed and uniformity. My invention also contemplates the provision of a simple apparatus upon which the construction of casings of any desired dimensions may be carried on in an efficient and uniform manner. Other objects of my invention will appear from the description hereinafter and the features of novelty will be pointed out in the appended claims.

In the accompanying drawings I have illustrated examples of my improved casing in course of construction, and means which may be utilized in its production together with an example of my new apparatus. Referring to said drawings Figure 1 is a side elevation of a drum which may be utilized in carrying out the initial steps of the process; Fig. 2 is an edge view thereof; Fig. 3 is a face view showing the product at one stage of the process of construction; Fig. 4 is a section thereof on the line 4—4 of Fig. 3; Fig. 5 is a face view of a strip of binding tape which may be used in the process; Fig. 6 illustrates another step in said process; Fig. 7 is a cross-section on the line 7—7 of Fig. 6; Fig. 8 is a diagrammatic perspective view of the completed carcass; Fig. 9 is a diagrammatical sectional view showing the carcass in position on one form of core which may be used; Fig. 10 is an elevation of the new apparatus for producing the casing; Fig. 11 is a detail sectional elevation thereof; Fig. 12 is a detail section of one end portion of said apparatus on an enlarged scale; Fig. 13 is a sectional view on the line 13—13 of Fig. 11; Fig. 14 is a similar view on the line 14—14 of Fig. 11; Fig. 15 is a detail section on the line 15—15 of Fig. 11; Fig. 16 is a detail view of the partly completed carcass as it appears during construction upon the apparatus; and Fig. 17 is a detail view of a locking washer forming part of my improved apparatus.

In carrying out my invention I first construct a band of composite material comprising a plurality of cords of suitable diameter laid alongside of and in engagement with each other upon a sheet of unvulcanized rubber or similar material. The cords if desired may be impregnated, coated or otherwise treated with rubber or a rubber composition. The nature of the cords or the physical characteristics of the sheet of rubber or both may be utilized to unite the cords and rubber sheet in the form of a band of composite material of any desired width, or other means may be used for the purpose. The said composite material may be constructed in any suitable manner either continuously and cut into proper lengths or in individual lengths of the desired dimensions. For instance a plurality of cords arranged in parallel and close relation to each other to form groups of the desired dimensions and the rubber in sheet form may be continuously fed through suitable mechanism so that the cords will be laid upon one surface of said sheet rubber and united therewith or the same result may be obtained by manual operation, in either case the construction of the composite material being carried on as a continuous operation, the material as before stated being cut, as needed, into the desired lengths. When said composite fabric is constructed in individual lengths of the desired dimensions the drum 1 shown in Figs. 1 and 2 may be utilized, the said drum being rotatably mounted upon a supporting frame 2, and actuated in any suitable manner as by means of a manually operated crank 3. If the drum is used in constructing the composite material a sheet of rubber 4 of the desired width and of a length sufficient to completely encircle the drum is placed upon the periphery thereof and has its opposite ends temporarily secured to the drum in any suitable manner. The physical characteristics of the rubber sheet 4 may be relied upon to temporarily fasten its ends upon the drum, or a suitable adhesive may be applied to said drum or to the rubber sheet for this purpose, the two ends of said rubber sheet 4 in any case preferably overlapping each other to a slight extent. After the sheet of rubber 4 has been placed upon the drum 1 one end of the cord 5, a supply of which may be contained upon a suitably mounted spool, is attached to the rubber sheet 4 at about the point where the two ends thereof come together. The nature of the cord or the physical characteristics of the rubber or both may be relied upon to retain the said end of the cord upon the rubber sheet or any other method or means may be utilized as desired.

After the end of the cord 5 has been attached to the rubber sheet 4 as described, the drum 1 is rotated at any convenient or desired speed for instance manually through the medium of the crank 3 whereby the cord 5 is spirally wound about the drum 1 and upon the sheet of rubber 4. As the drum 1 is rotated and the cord 5 is thus spirally wound thereon, the said cord is preferably guided in any suitable manner for instance by an operator or automatically in such a way that the convolutions of cord will all lie closely adjacent to and in contact with each other, the rotation of the drum being continued until a sufficient amount of cord has been wound thereon to produce a band of the desired width. After the winding operation has been completed the combined cords 5 and rubber sheet 4 are cut preferably on the bias and preferably at points corresponding to the beginning and ending of the winding of the cord. The combined sheet of rubber and cords is then removed from the drum in the form of a band of composite material having its opposite ends on the bias and which appears as illustrated diagrammatically in Figs. 3 and 4. In case one supply of cord gives out before the winding operation has been completed or in other words before a sufficient number of convolutions of cord have been wound upon the drum to produce the desired width, the loose or terminating end of the cord upon the drum is cut at a point in registry with the attached end of the cord or in other words with the point of beginning of the winding unless said terminating end already registers with this point. The end of a new supply of cord is then secured to the sheet of rubber 4 in substantial engagement with the terminating end of the previous supply and the winding operation is continued. By proceeding as above the transverse cut across the combined cords and sheet of rubber will register with the point at which one supply of cord terminates and another begins so that short lengths of cords likely to become loose or otherwise disarranged are avoided. The band of composite material above mentioned, before being used for its intended purpose, is preferably transferred to a table or other support 6 for instance of the kind illustrated in plan view in Fig. 6. The top of this table is preferably provided with a plurality of upright projections $6^a$ arranged in two parallel rows and at a distance from each other, the rows of projections being spaced apart sufficiently to accommodate the band of composite material between them and the projections in one row being offset with respect to those in the other row. These projections $6^a$ serve as abutments against which to rest a straight edge or the like and accordingly are so arranged with respect to each other as to position the said straight edge at the desired angle for the purpose to be more clearly described hereinafter. In the preferred construction the projections $6^a$ are adjustable and as shown by way of example in Figs. 6 and 7 may be carried by blocks $6^b$ slidably mounted upon rods or the like $6^c$ secured upon the table 6 at opposite edges thereof. The said blocks $6^b$ and projections $6^a$ may be secured against unintentional movement in any suitable way as for instance by means of set screws $6^d$.

As before stated the band of composite material comprising the cords 5 and rubber sheet 4 may be placed upon this table and in this case is positioned between the rows of projections $6^a$. A straight edge is then placed against the two projections $6^a$ located for instance at the right hand end of each row and the band of material is trimmed along the free edge of said straight edge if the previous bias cut made prior to the removal of said material from the drum 1 does not properly register with said straight edge. The latter is then successively placed against the other projections $6^a$ in contact with the upper surface of said band of composite material and each time a line 7 is drawn upon said upper surface along the free edge of said straight edge. When the two final projections $6^a$ located at the left hand end of each row are reached the band of material is cut along said straight edge after which a binder 8 consisting for instance of a section of tacky material properly cut and dimensioned may be secured to one end of said band of composite material upon the lower surface thereof which is the exposed surface of the rubber sheet 4.

The said band of material is then removed from the table and is spirally wound upon and between two annular members or rings 9 held in fixed spaced and preferably parallel relation to each other. The annular members or rings referred to may be of any type and may for instance each comprise a plurality of wires wrapped with adhesive tape or the like to preserve the coöperative relation of said wires or they may consist of single wires spirally wound and suitably bound together. Or said rings may be constructed of flexible material such as cord or the like, the physical characteristics of the rings being predetermined according to the particular characteristics of the casing which is to be built or in accordance with other predetermined requirements. The rings in all cases have a diameter proportionate to or in harmony with the intended diameter of the finished casing at the bead or edge portions thereof and so as to produce the desired results, whatever they may be. In winding the composite material upon the rings the band of material is passed back and forth between the same and over and under and around said rings with the exposed surface of the rubber sheet 4 facing inwardly in the outer layer and outwardly in the inner layer or in other words contacting with the rings. At the beginning of the winding operation the binder 8 may be temporarily secured to one ring so as to fasten the one end of the band of composite material in position during said winding operation. In winding the band of composite material upon the rings, the lines 7 may be used as guides to indicate the extent to which the band of composite material is to be pulled or laid between the rings 9. In other words, the said band of material, each time it passes across from one ring to another, is pulled or laid until the particular line 7 registers with the ring about which the turn is to be made. The winding operation is continued until the final end of the band of composite material for instance reaches the previously attached starting end thereof in which case the binder 8 may be detached from the one ring and used to bind the two ends of the band of composite material together. It will, of course, be obvious that the arrangement and the method of procedure may be such that the final end of the band being wound will, at the end of the winding operation whereby said band is combined with the rings, be located at some point thereon other than the point at which the starting end of the band is located, this being of no material consequence and being determined by the character of the winding and other things. The composite material is always combined with the rings, preferably in such a manner that the cords 5 extend diagonally across the space between the rings 9 so as to be inclined relatively thereto, the angle of inclination being optional, it being understood that the cords in the inner and outer layers are inclined in opposite directions relatively to each other. The winding operation may be so carried out that each successive convolution of the band of composite material will be closely adjacent to and in contact with the previous convolution or so that a space corresponding for instance to the width of said band of material will exist between said convolutions both in the inner and outer layers. In the latter case the angle of inclination of the cords relatively to the rings is increased and the spaces between the convolutions are filled by winding a second band of composite material upon the rings in the same way as above described and so as to lie between the convolutions of the first band. If more than one band of material is utilized to carry out the process the winding operation of the second band is preferably started at a point opposite to the point at which the winding of the first band was commenced.

In all cases the winding operation or in other words the combination of the band or bands of composite material with the rings produces a unit or carcass of substantially cylindrical form as shown diagrammatically in Fig. 8, and having an inner and outer layer of composite material, applied in the form of bands and consisting of groups of cords and the sheet rubber, the rubber sheet of the outer layer of material facing the rubber sheet of the inner layer, and the rings being entirely concealed. It will, of course, be apparent that, if desired or found necessary for any special purpose, the carcass may be formed with a plurality of inner and outer layers of composite material.

After the said carcass has been completed in the form of a substantially cylindrical unit it may, if necessary or desirable, have its interior surface covered with unvulcanized rubber sheeting or other suitable material to any desired extent and reinforcing strips of suitable material may be located along or adjacent to its edges or said carcass may be otherwise amplified according to the requirements of any specific structure which may be desired. After having been amplified or immediately after having been completed in the form of a substantially cylindrical unit, said carcass may be placed upon a collapsed air tube or bag which is then inflated as shown diagrammatically in Fig. 9, the edges of said carcass being left free to assume any position to which the strains produced by the inflation of said air bag may move them. As the air bag is inflated the intermediate portions of the carcass will be bulged outwardly and the edge portions thereof will be drawn toward each other, as shown diagrammatically in Fig. 9, said edge portions as before stated being free to accommodate themselves to any strains exerted by said inflated air bag. The carcass having been preliminarily shaped as described the process of completing the casing may be carried on in any well known way. Instead of using an air bag and inflating same as described, a core of any suitable and well known type may be substituted, the carcass in any case, as completed being finally placed in a vulcanizing mold and subjected to the vulcanization process in the usual manner. During the preliminary shaping and finishing of the carcass the opposed layers of rubber sheeting are forced into contact with each other so as to become united and in addition to any other function which may be performed serve to maintain the convolutions of the cords of each layer in proper relation to each other and against any appreciable separation during the finishing operations. The said rubber sheeting at all stages provides a foundation upon which the cords are laid and by which said cords are efficiently maintained in the form of a band. As the carcass is vulcanized the parts thereof become united in the form of a homogeneous mass of extreme strength and toughness and in which relative movement of any previously individual parts is absolutely obviated so that internal wear during use is done away with as a result of which the life of the tire casing is materially increased. By first constructing the composite material of cords and sheet rubber or other suitable material in the form of bands which are combined with the annular members or rings, it is possible to locate more cords of a given size within an inch or other unit of measurement than can be done if the cord in single or even in double strands is combined with the rings as has heretofore been attempted. This results in a construction of much greater compactness with a consequent increase in efficiency and serviceability.

During the combining of the composite material with the rings 9 the latter are supported in position and in proper coöperative relation to each other by the apparatus shown in Figs. 10 to 17 inclusive. As shown in the illustrated example the said apparatus comprises a support which may be of any suitable construction and which as shown comprises an upright stand 10 provided at its upper end with a bearing 11 in which one preferably reduced end 12 of a substantially horizontal shaft 13 is located, the latter in the illustrated example being formed with an annular shoulder 14. Any suitable means may be utilized for preventing a lengthwise movement of the shaft 13 in the bearing 11; for instance to prevent movement in one direction, the outer end of the shaft 13 may project beyond the bearing 11 and be fitted with a washer 15 engaging one end of said bearing and itself held in place by a locking collar 16 secured upon the shaft 13 for instance by means of a pin 17 extending transversely through said collar 16 and shaft 13. Lengthwise movement of the shaft 13 in the opposite direction may be prevented, as shown in the illustrated example, by means of a brake drum 18 secured upon the shaft 13 by a key and keyway 19 and located between the other end of the bearing 11 and the annular shoulder 14 as shown in Fig. 11. In order to lock said shaft against rotation, if desired, I prefer to provide a braking device which may be of any suitable construction and as shown comprises a pair of bands 20 and 20$^a$ pivoted upon a pivot pin 21 carried by the stand 10 and extending about the drum 18 as shown in Fig. 15. The free ends of the bands 20 and 20$^a$ are separated from each other, the band 20 being provided with a bearing 22 in which a transverse stud 23 is journaled while the band 20$^a$ is constructed with a bearing 24 in which an internally screw-threaded block 25 is rotatably mounted. The stud 23 is screw-threaded as at 26 and passes through said block 25 in coöperative engagement therewith and is further formed with an angular head 27 upon which an operating handle 28 is secured. It will readily be seen that by actuating the handle 28 in one direction or the other the stud 23 will be correspondingly actuated and through the coöperation of the screw-threaded portion 26 and the block 25 will move the free ends of the bands 20 and 20$^a$ toward or away from each other. In this manner said bands are either drawn into frictional engagement with the drum 18 to lock the shaft 13 against rotation in the bearing 11 or forced out of contact with said drum to release said shaft.

The shaft 13 further carries plates 29 and 29$^a$ which may be of duplicate construction and which are located at a distance from each other as shown in Fig. 11, the plates being both formed with preferably integral sleeves 30 and 30$^a$ which surround the shaft 13 and project from said plates in opposite directions. The combined plates 29, 29$^a$ and sleeves 30, 30$^a$ are preferably secured upon the shaft 13 for instance by means of keys 31 and 31$^a$ coöperating with keyways 32 and 32$^a$ formed in the shaft 13. In the preferred construction at least one of said keyways, for instance 32 is made of increased length as shown in Fig. 12 in order to permit the plate 29 and its sleeve 30 to be moved toward and away from the plate 29$^a$ for the purpose to be more fully stated hereinafter, it being understood that an adjustment of both plates toward and away from each other may be provided for if this should be desired. The sleeves 30 and 30$^a$ are externally screw-threaded as indicated at 33, for the accommodation of collars 34 internally screw-threaded as at 35 to coöperatively engage the screw-threads 33.

The screw-threads 33 and 35 are preferably rather coarse as shown in Figs. 11 and 12 to provide for a quick adjustment of the collars 34 and their connected parts to be hereinafter described upon the sleeves 30 and 30ª. In the illustrated example operating hand wheels 36 are connected with the outer ends of said collars 34 in any suitable manner as by means of bolts 37, it being understood that said hand wheels 36 are constructed with axial openings of greater diameter than the threads 33 so as not to engage the latter. The collars 34 are also preferably provided with external screw threads 38 which are preferably relatively finer than the threads 33 and 35 and carry internally screw-threaded rings 39 in cooperative engagement with the threads 38 as shown in Figs. 11 and 12 whereby said rings 39 are adjustable lengthwise of the collars 34 as will be readily apparent. Any suitable means may be provided for locking said rings 39 in their adjusted positions upon the collars 34 as for instance annular locking members 40 internally screw-threaded for engagement with the threads 38 of the collars 34. In the preferred arrangement locking washers 41 are located between the rings 39 and the locking members 40 and are preferably held against rotation relatively to the collars 34 for instance by means of projections 42 extending into recesses 43 extending lengthwise and preferably throughout the length of said collars 34 as shown in Figs. 11 and 12. With this arrangement the locking members 40 when being screwed up to lock the rings 39 in an adjusted position will engage the washers 41 and will be prevented thereby from causing any unintentional movement of said rings 39 whereby the adjustment thereof might be disturbed. The rings 39 are each formed with an annular recess 39ª for the accommodation of link rings 44 loosely mounted therein and retained against any substantial movement relatively to the rings 39 in an axial direction by means of retaining collars 45 secured to the rings 39 for instance by screws 45ª, the collars 45 being of sufficiently large internal diameter to avoid contact with the threads 38 and together with the recesses 43 forming annular grooves in which the link rings 44 are located as shown in Fig. 11. The link rings 44 are provided with a plurality of lugs 46 extending radially outward in pairs from the peripheries of said link rings and comprising either separate elements suitably secured in position or being made integrally with said link rings as shown in Fig. 14. Links 47 having one end located between each pair of lugs 46 and pivotally connected thereto as at 48 extend through radially extending apertures or slots 49 formed in the plates 29 and 29ª as shown in Fig. 13, the opposite ends of said links being pivotally connected at 50 with members 51 preferably forming integral extensions of arms 52 as shown in Fig. 11.

In the preferred arrangement one or more of the slots 49 of each plate 29 and 29ª are shaped so as to substantially fit the links 47 and in combination with said links serve to hold the link rings 44 against rotation when the hand wheels 36 are actuated to operate the mechanism as will be more fully pointed out hereinafter. It will of course be obvious that all of the slots 49 of each plate 29 and 29ª may be constructed to fit the links 47 although this is not necessary and two slots 49 constructed as shown in Fig. 13 have been found sufficient for the intended purpose. The arms 52 are pivotally connected at 53 with brackets 54 carried by the plates 29 and 29ª and secured thereto in any suitable manner as by means of screws 55, it being understood that in some cases the brackets 54 may be replaced by lugs formed integrally with the plates 29 and 29ª without affecting the operation or efficiency of the apparatus. The arms 52 preferably form an obtuse angle with the members 51 as shown in Figs. 11 and 12 and in the assembled condition of the apparatus project toward each other, each plate 29 and 29ª carrying a plurality or group of such arms as shown in Figs. 10 and 11. At their free ends the arms 52 are formed with heads 56 provided with grooves 57 in which tip plates 58 having hooks 59 at their outer ends are secured by means of screws or the like 60. The heads 56 are arranged at an angle to the arms 52 so as to be inclined across the major axis thereof and so as to position the tip plates 58 at an angle corresponding substantially to the angle at which the bands of composite material composed for instance of the sheet rubber 4 and cords 5 extend between the annular members or rings 9 previously mentioned herein. In some cases the heads 56 may also be tilted somewhat at an angle to the faces of the arms 52 in order to provide a position of maximum efficiency of the tip plates 58 in all adjustments of said arms 52. If desired each plate 29 and 29ª may be provided with screw-bolts 61 which extend through said plates and are arranged to engage the inner ends of the collars 34 for the purpose of arresting the movement thereof in one direction when the hand wheels 36 are manipulated.

In utilizing my new apparatus the mechanism is first adjusted to properly coöperate with the internal diameters of the annular members or rings 9 which it is desired to use and which always bear a certain predetermined relation to the size of the particular tire casing under construction. This adjustment may be accomplished by first screwing the locking members 40 away from the rings 39 which in this manner are freed and may be thus rotated in one direction or the other upon the collars 34 and in the link rings 44 the latter being held against rotation relatively to the collars 34 through the coöperation of one or more links 47 and corresponding slots 49 of the plates 29 and 29ᵃ as previously pointed out. As the rings 39 are thus rotated upon the collars 34 a pull or a push will be exerted on the link rings 44, this depending upon the direction of rotation, and in any case will be transferred coincidentally to the members 51 of a given group of arms 52. The actuation of said members 51 will in turn bring about a coincidental pivotal movement of all of the arms 52 of said given group upon their pivots 53 and will either move the heads 56 and tip plates 57 inwardly to contract the spaces between these elements of said group or outwardly to increase the distances therebetween. In other words the operations so far described may be said to bring about a contraction or expansion of the means whereby the annular members or rings 9 are supported. It will be understood that the adjustment just described is always approximately such that when the arms 52 occupy their outer positions, the distance between the hooks 59 of two diametrically opposite arms 52 corresponds substantially to the internal diameters of the annular members 9 which are to be used. After the desired adjustment has been had the locking members 40 are again screwed up to lock said rings 39 in their adjusted positions, the lock washers 41 as before stated serving to prevent any movement of said locking members 40 from disturbing the adjustment. At this time or previously or later on as may be desired the plate 29 may be adjusted toward and away from the plate 29ᵃ or both plates may be adjusted relatively to each other as the case may be to properly adjust the tip plates 58 of one group with respect to the tip plates 58 of the other group to properly space the annular members or rings 9 apart. This spacing of the parts also bears a predetermined relation to the size and dimensions of the casings which are to be constructed.

After the parts have been properly adjusted as described the hand wheels 36 are rotated in directions to move the collar 34 to the right upon the sleeve 30ᵃ and to move the corresponding collar 34 to the left upon the sleeve 39. This actuation of said hand wheels 36 serves to rotate the collars 34, rings 39, 40 and 45 and washers 41 as a unit within the link rings 44 and thus exerts a pull upon the latter which is transferred to the links 47 and members 51 and results in a coincidental pivotal movement of the arms 52 of each group toward each other whereby the heads 56 and tip plates 58 of said groups are moved inwardly or in other words the means for holding the annular members or rings 9 is contracted. One ring 9 is now first slipped upon the machine and over the tip plates 58 of the right hand group of arms 52 in Fig. 11 after which the coöperating hand wheel 36 is operated in the reverse direction to move the collar 34 to the left upon the sleeve 30ᵃ. This operation exerts a pushing action upon the right hand link ring 44 which is communicated to the links 47 and causes the arms 52 to be moved outwardly. This operation is continued until the tip plates 58 engage the ring 9 from the inside and firmly clamp it in position without any strain tending to distort or injure it, said ring being manipulated to bring it immediately behind the hooks 59 in its final position as shown in Fig. 11. The second ring 9 may now be similarly combined with the tip plates 58 of the left hand group of arms in Fig. 11 and the coöperating hand wheel 36 actuated to clamp said ring upon said tip plates and behind the hooks 59 thereof. In order to produce uniform results in succeeding combinations of the apparatus with annular members or rings of the same diameter and to make it certain that the arms 52 and their connected parts will be moved outwardly to the same extent each time, the screws 61 may be set so as to arrest the inward movement of the collars 34 at the proper point which is determined by the internal diameters of the rings in question and is thus fixed as long as the apparatus is used with rings of any particular given diameter. In other words the means for holding the annular members or rings 9 will be uniformly expanded each time a new set of rings is combined with the apparatus whereby the care necessary to properly actuate the mechanism and to avoid a distortion of or injury to said rings is reduced to a minimum.

After two rings have been properly supported upon the machine in the desired fixed relation to each other the combining of the bands of composite material may be proceeded with. In carrying out this operation as shown in the illustrated example one end of a band of composite material is temporarily secured to one of the rings 9 at some point of its periphery as hereinbefore described, and in the space between two adjacent tip plates 58 of one of the groups. The said band of material is then passed over to the second ring to the space between two adjacent tip plates 58 which is advanced with respect to the space between the tip plates at which the operation started. The said band thus extends diagonally across the space between the two rings in a direction inclined thereto as shown in Figs. 8, 10, 11 and 16, and is passed around the second ring and back to the first ring to a space between two adjacent tip plates which again is advanced with respect to the last previous space. The applying of the band of material is continued in this manner and is passed back and forth between and around the two rings in the form of a spiral winding, the operation continuing for instance until the first end of the band is reached, in which case both ends of the band may be secured for instance by means of the binder tape 8 hereinbefore mentioned, or until the terminating end of the particular band being wound is reached and otherwise secured in position. At the completion of the operation just described the carcass will have for instance the appearance shown by way of example in Fig. 10 in which it will be seen that spaces corresponding to the width of the band of composite material exist between the convolutions of said band. In order to fill these spaces and complete the carcass a second band of composite material is applied to the rings in the same way as the first and so that the convolutions of said second band will occupy the spaces between the convolutions of the first band. In the preferred arrangement the winding of the second band is started at a point opposite the starting point of the first band although this is not essential and any other proceeding may be followed. During the winding of the bands, the material in passing between the rings is drawn so as to bring one of the marks or lines 7 appearing on said bands into registry with a ring, said marks or lines 7 thus serving as a guide for the operator and assuring uniform results and also making it absolutely certain that the ends of the composite bands will meet properly in case this is desired. These marks or lines 7 are always produced upon the bands of material at angles corresponding to the circumferential direction of the rings 9 relatively to the bands when the latter are applied thereto and thus may always be brought into proper registry with said rings during the winding operation.

After the carcass has been completed the hand wheels 36 are actuated to move the arms 52 inwardly whereby the rings are released so that the finished carcass may be readily removed 'from the apparatus and converted into a finished casing. During the winding of the bands upon the rings the mechanism may be held stationary by the brake 20—20ª or if desired said brake may be released to permit the shaft 13 to rotate in the bearing 11. In the latter case the rings may be intermittently rotated to facilitate the winding operation and to bring the mechanism to positions most comfortable to the operator as the winding proceeds.

It will be seen that my apparatus is extremely simple in construction and efficient in operation and provides an arrangement which, once it has been properly adjusted, automatically maintains said adjustment so that the care and effort in operating said apparatus is reduced to a minimum.

When the rings are in position on the apparatus it will be seen that the tip plates 58 engage said rings from the inside at equidistant intervals and in addition to their supporting function serve as guides for accurately indicating the spaces in which the bands are to be passed around the rings. The distance between adjacent tip plates of a group also serves to indicate the width which is desirable in the composite bands to most efficiently carry out the process in each case. In addition the hooks 59 of said tip plates 58 prevent the rings from being drawn from the latter and toward each other under the tension of the bands during the winding operation. The tip plates 58 and their hooks 59 are constructed of relatively thin material and thus do not interfere with the winding of the bands to any appreciable extent. It will of course be understood that the method of winding the bands upon the rings as described with respect to my apparatus, while it may be the preferred method, is only an example and that the apparatus may be efficiently used in combination with other methods of winding for instance one in which the convolutions of one band of composite material are closely adjacent to each other. In all cases inner and outer layers of composite bands are formed on the rings with the rubber strips in opposed face to face relation to each other. The bands in the preferred form extend diagonally across the space between said rings as is clearly shown in Figs. 8, 10 and 11, and include a maximum number of cords to the inch whereby a structure of great compactness and having relatively high powers of resistance is produced which at the same time produces an efficient amount of flexibility and resiliency in the finished casing.

My apparatus is rapid in operation and will quickly clamp the rings in position and as quickly release the same and at the same time insures absolutely uniform results, thus making it possible to produce carcasses of absolute uniformity at a maximum speed of operation, whereby casings of maximum efficiency in all respects are assured.

Various changes in the specific forms shown and described may be made within the scope of the claims without departing from the spirit of my improvements.

I claim:

1. Apparatus of the kind described comprising two alined sets of supports for two annular members, each set consisting of a series of annularly disposed fingers spaced apart from each other to permit a band of cords to be passed over the annular members and between two of the adjacent fingers.

2. Apparatus of the kind described comprising two alined sets of supports for two annular members, each set consisting of a series of annularly disposed fingers spaced apart from each other to permit a band of cords to be passed over the annular members and between two of the adjacent fingers, at least one of said sets of fingers being collapsible to permit the removal of the finished casing.

3. In an apparatus of the kind described, the combination of opposed supporting devices, a pair of annular members carried by said supporting devices in spaced relation to each other, said annular members being held against movement relatively to said devices when combined therewith, and means for adjusting said devices to accommodate annular members of varying diameters.

4. In an apparatus of the kind described, the combination of opposed supports each comprising a series of annularly disposed members spaced apart from each other, a pair of annular members carried by said supports in spaced relation to each other and held by said series of members against relative circumferential movement and means whereby the space between said annular members may be adjusted to predetermined dimensions.

5. In an apparatus of the kind described, the combination of opposed supporting devices, a pair of annular members carried by said supporting devices in spaced relation to each other, said annular members being held against movement relatively to said devices when combined therewith, means for adjusting said devices to accommodate annular members of varying diameters and means for varying the space between said annular members.

6. An apparatus of the kind described comprising two groups of devices located at a distance from each other and adapted to support a pair of annular members from the inside, and means for expanding and contracting said devices whereby said annular members are clamped and released.

7. An apparatus of the kind described comprising two groups of devices located at a distance from each other and adapted to support a pair of annular members from the inside, one group of devices being movable toward and away from the other to adjust the distance therebetween and means for expanding and contracting said devices whereby said annular members are clamped and released.

8. An apparatus of the kind described comprising two groups of devices located at a distance from each other and adapted to support a pair of annular members, means for expanding and contracting said devices whereby said annular members are clamped and released and means associated with said first named means whereby the extent of expansion of said devices is varied to accommodate annular members of different diameters.

9. An apparatus of the kind described comprising two groups of devices located at a distance from each other and adapted to support a pair of annular members, means for expanding and contracting said devices whereby said annular members are clamped and released, means associated with said first named means whereby the extent of expansion of said devices is varied to accommodate annular members of different diameters and means whereby one group of devices is adjustable toward and away from the other group to vary the distance therebetween.

10. An apparatus of the kind described comprising a support, a pair of members carried by said support at a distance from each other, a group of clamping devices pivotally mounted upon each member and adapted to support a pair of rings in spaced relation to each other, and means associated with said members for pivotally actuating said clamping devices to clamp said rings and to release same.

11. An apparatus of the kind described comprising a support, a pair of members carried by said support at a distance from each other, a group of clamping devices pivotally mounted upon each member and adapted to support a pair of rings in spaced relation to each other, means for pivotally moving said devices outwardly to a predetermined point to clamp said rings in operative position and for pivotally moving said devices inwardly to release said rings, and means for varying the point to which said devices are moved outwardly whereby rings of different diameters are accommodated.

12. An apparatus of the kind described comprising a support, a pair of members carried by said support at a distance from each other, a group of clamping devices pivotally mounted upon each member and adapted to support a pair of rings in spaced relation to each other, means for pivotally moving said devices outwardly to a predetermined point to clamp said rings in operative position and for pivotally moving said devices inwardly to release said rings, means for varying the point to which said devices are moved outwardly whereby rings of different diameters are accommodated and means whereby at least one of said members is adjustable to vary the distance between the groups of devices.

13. An apparatus of the kind described comprising a supporting member, means carrying said member, a pair of plates carried by said member at a distance from each other, externally screw-threaded extensions carried by said plates, a group of arms pivotally mounted upon each plate and extending toward each other for supporting a pair of rings in spaced relation to each other, screw-threaded collars in coöperative engagement with said plate extensions, links connecting said arms with said collars and means for rotating said collars upon said plate extensions whereby said arms are moved outwardly to clamp said rings and inwardly to release the same.

14. An apparatus of the kind described comprising a supporting stand, a stand shaft carried by said supporting stand, a pair of apertured plates carried by said shaft at a distance from each other, externally screw-threaded sleeves on said shaft forming extensions of said plates, a group of arms pivotally mounted upon each plate and extending toward each other for supporting a pair of rings in spaced relation to each other, internally screw-threaded collars in coöperative engagement with said sleeves, means adjustably mounted upon said collars and movable lengthwise thereof, means for locking said adjustable means upon said collars, links extending through the apertures of said plates and connected with said arms and with said adjustable means and hand wheels for rotating said collars upon said sleeves whereby said arms are movable outwardly to clamp said rings and inwardly to release same.

15. An apparatus of the kind described comprising a supporting stand, a stand shaft carried by said supporting stand, a pair of apertured plates carried by said shaft at a distance from each other, externally screw-threaded sleeves on said shaft forming extensions of said plates, a group of arms pivotally mounted upon each plate and extending toward each other for supporting a pair of rings in spaced relation to each other, internally screw-threaded collars in coöperative engagement with said sleeves, said collars being also externally screw-threaded, the latter threads being finer than the internal screw-threads, internally screw-threaded rings in coöperative engagement with said collars and adjustable lengthwise thereof, means for locking said internally screw-threaded rings upon said collars, link rings loosely mounted upon said internally screw-threaded rings, retaining means for retaining said link rings upon said internally screw-threaded rings, links extending through the apertures of said plates and pivotally connected with said arms and with said link rings and hand wheels connected with said collars for rotating same upon said sleeves whereby said arms are movable outwardly to clamp said rings and inwardly to release same.

16. An apparatus of the kind described comprising a supporting stand, a shaft rotatably mounted thereon, a pair of plates carried by said shaft at a distance from each other, a group of arms pivotally mounted upon each plate and adapted to support a pair of rings in spaced relation to each other, means associated with said plates whereby said arms are moved outwardly to clamp said rings and inwardly to release same and brake mechanism whereby said shaft is locked against rotation in said stand.

17. An apparatus of the kind described comprising a supporting stand, a shaft mounted thereon, a pair of plates carried by said shaft at a distance from each other, a group of arms pivotally mounted upon each plate, tip plates carried by said arms for supporting a pair of rings in spaced relation to each other and means associated with said pair of plates whereby said arms are movable outwardly to clamp said rings and inwardly to release same.

18. An apparatus of the kind described comprising a supporting stand, a shaft mounted thereon, a pair of plates carried by said shaft at a distance from each other, a group of arms pivotally mounted upon each plate and adapted to support a pair of rings in spaced relation to each other, means associated with said plates whereby the arms of each group are concurrently moved outward to clamp said rings and inward to release same and mechanism associated with said means whereby the arms of each group are concurrently adjusted to accommodate rings of different diameters.

19. In an apparatus of the kind described the combination of a pair of spaced annular members and means for supporting said annular members in spaced relation to each other against any material deformation in a radial direction and against any material deformation toward each other, said supporting means engaging said annular members at spaced intervals whereby the latter may receive cord windings extending between and about the same.

20. In an apparatus of the kind described the combination of a pair of spaced annular members arranged to receive a band of material wound between and about the same and means for supporting said annular members in spaced relation to each other, said supporting means and annular members when combined being held against movement relatively to each other, and said supporting means engaging said annular members at intervals spaced apart distances corresponding approximately to the width of the band of material.

21. In an apparatus of the kind described the combination of a pair of annular members arranged to receive a helical winding of cord extending between and around the same, two sets of supporting members arranged in spaced relation to each other, and members carried by said supporting members whereby said annular members are maintained in spaced relation to each other, said means extending relatively to the annular members in the same direction as the helix of the winding.

22. In an apparatus of the kind described the combination of a pair of annular members arranged to receive a helical winding of cord extending between and around the same, two sets of supporting members arranged in spaced relation to each other and tip plates carried by said supporting members whereby said annular members are supported in fixed relation to said supporting members and in spaced relation to each other, said tip plates extending relatively to the annular members in the same direction as the helix of the winding.

23. In an apparatus of the kind described, the combination of opposed supports located in spaced relation to each other and each comprising a series of annularly disposed members spaced apart from each other and a pair of annular members carried by said annularly disposed members, said annular members being held by said annularly disposed members against circumferential movement relatively thereto.

24. In an apparatus of the kind described, the combination of a pair of spaced, annular members, and means for supporting said annular members in spaced relation to each other and a band of material wound between and around said annular members and coöperating with said means to resist a circumferential movement of said annular members relatively to said supporting means.

25. In an apparatus of the kind described, the combination of a pair of annular members, two alined sets of supports for said annular members, each set consisting of a series of annularly disposed members spaced apart from each other to permit a band of material to be passed over the annular members and between two adjacent annularly disposed members, the latter coöperating with said band of material to resist a circumferential movement of said annular members relatively to said annularly disposed members.

26. In an apparatus of the kind described the combination of a pair of annular members, and means for supporting said annular members during the winding operation, said supporting means leaving substantially all parts of said annular members coincidentally accessible for the reception of a winding of cord extending about and between said annular members whereby a circumferential shifting of said annular members is unnecessary.

27. In an apparatus of the kind described, the combination of a pair of annular members, and a plurality of supporting members carrying said annular members and engaging the same at spaced intervals whereby substantially all parts of said annular members are coincidentally accessible for the reception of a winding of cord extending about and between said annular members and a circumferential shifting thereof is unnecessary.

In testimony whereof I have hereunto set my hand.

FRED B. CARLISLE.